United States Patent [19]

Blech et al.

[11] Patent Number: 5,248,889
[45] Date of Patent: Sep. 28, 1993

[54] LASER APPARATUS AND METHOD FOR MEASURING STRESS IN A THIN FILM USING MULTIPLE WAVELENGTHS

[75] Inventors: Ilan A. Blech, Sunnyvale; Dov E. Hirsch, Cupertino, both of Calif.

[73] Assignee: Tencor Instruments, Inc., Mountian View, Calif.

[21] Appl. No.: 655,010

[22] Filed: Feb. 13, 1991

Related U.S. Application Data

[63] Continuation-in-part of Ser. No. 567,981, Aug. 14, 1990, Pat. No. 5,134,303.

[51] Int. Cl.$^5$ .................. G01N 21/86; G01B 11/30
[52] U.S. Cl. ..................... 250/561; 250/226; 356/371
[58] Field of Search ............... 250/560, 571, 226, 561; 356/32, 381-382, 371, 376, 1

[56] References Cited

U.S. PATENT DOCUMENTS

| | | | |
|---|---|---|---|
| 3,857,637 | 12/1974 | Obenreder | 356/237 |
| 4,425,041 | 1/1984 | Nishiyama | 356/371 |
| 4,789,237 | 12/1988 | Inoue | 250/226 |
| 4,865,445 | 9/1989 | Kuriyama et al. | 356/382 |
| 4,900,940 | 2/1990 | Nakamura | 250/560 |
| 5,072,128 | 12/1991 | Hayano et al. | 250/226 |
| 5,118,955 | 6/1992 | Cheng | 250/561 |
| 5,118,957 | 6/1992 | Kawashima et al. | 250/561 |
| 5,134,303 | 7/1992 | Blech et al. | 250/226 |

FOREIGN PATENT DOCUMENTS

| | | | |
|---|---|---|---|
| 0251610 | 11/1987 | German Democratic Rep. | 356/371 |
| 0261832 | 11/1988 | German Democratic Rep. | 356/382 |
| 0125865 | 11/1978 | Japan | 356/371 |
| 0055704 | 4/1983 | Japan | 356/381 |
| 0060203 | 4/1984 | Japan | 356/381 |
| 0237005 | 10/1986 | Japan | 356/371 |
| 0277508 | 12/1987 | Japan | 356/371 |
| 0051009 | 2/1990 | Japan | 356/377 |
| 2078944A | 1/1982 | United Kingdom | 356/371 |

*Primary Examiner*—David C. Nelms
*Assistant Examiner*—Michael Messinger
*Attorney, Agent, or Firm*—Skjerven, Morrill, MacPherson, Franklin & Friel

[57] ABSTRACT

An apparatus and a method for measuring the radius of curvature of a surface using a laser beam with a wavelength selectable from a plurality wavelengths are disclosed. The present invention avoids poor measurement due to destructive interference of the beams reflected at a thin film's upper and lower surfaces. The present invention is applicable to laser reflection stress measurement apparatuses of both scanning and beam-splitting types.

10 Claims, 7 Drawing Sheets

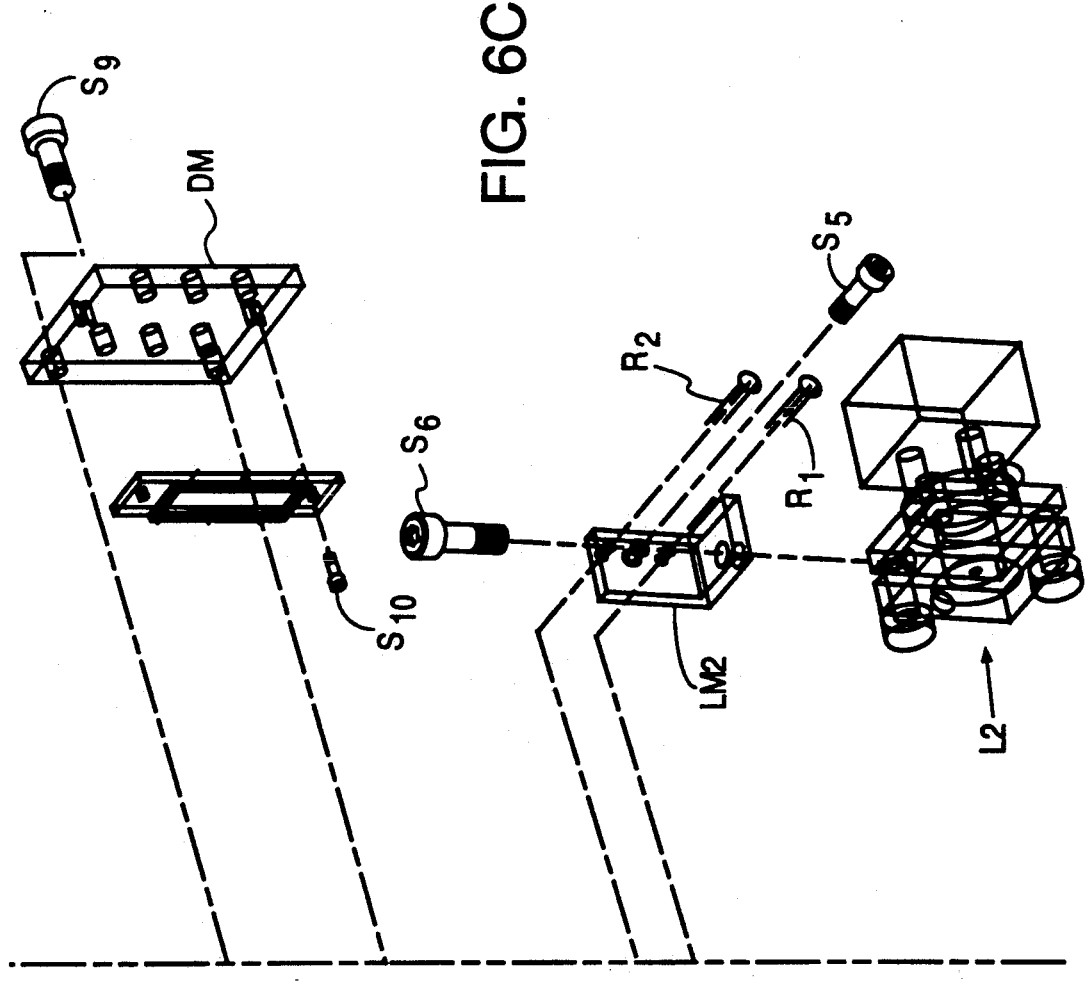

LASER APPARATUS AND METHOD FOR MEASURING STRESS IN A THIN FILM USING MULTIPLE WAVELENGTHS

This application is a continuation-in-part of an application entitled "Laser Apparatus and Method for Measuring Stress in a Thin Film Using Multiple Wavelengths" by Ilan A. Blech et al., Ser. No. 07/567,981, filed Aug. 14, 1990 now U.S. Pat. No. 5,134,303.

FIELD OF THE INVENTION

This invention relates to the use of lasers to measure the radii of curvature of reflective structures. In particular, this invention relates to the use of lasers to measure stress in a thin film formed on top of a substrate, by measuring the change in local radius of curvature of the substrate due to the presence of the thin film.

BACKGROUND OF THE INVENTION

Thin films of various materials are often used in the fabrication of semiconductor structures. The use of a laser to measure the radius of curvature of the surface of a semiconductor structure underneath a thin film is known in the art. Such a measurement is useful because the degree to which a thin film deforms the surface of a semiconductor structure, i.e. changes the local radius of curvature of the semiconductor structure, is indicative of the stress in the thin film. Thus, the measurement of the radius of curvature of a semiconductor structure is common, for example, in inspection of incoming wafers, as a monitor of the stability of a fabrication process, and for measurement of stress in a thin film.

The "cantilever beam" model, which is well known in the art, relates stress in a thin film to the material properties of the substrate (e.g. Young's modulus), the radius of curvature of the substrate, and the dimensions (e.g. thickness) of the thin film. Many techniques for measuring stress have been developed based on the cantilever beam model. Among these techniques are x-ray diffraction and laser reflection. A description of an x-ray diffraction technique may be found in an article entitled "Automatic x-ray diffraction measurement of the lattice curvature of substrate wafers for the determination of linear strain patterns" by A. Segmuller et al, J. Appl. Phys., volume 51, no. 12, December 1980, pp. 6224–30.

There are two principal types of laser reflection apparatuses—beam-splitting and scanning—for measuring radii of curvature. In both types of apparatus, the radius of curvature is derived by measuring the angles of reflection of an incident laser beam at two or more points of known separation on the surface of the substrate.

In a beam-splitting type laser reflection apparatus, the laser beam is split optically into two or more beams directed at the two or more points at which angles of reflection are measured. An example of stress measurement performed with a beam-splitting type laser reflection apparatus is given in the article entitled "In situ stress measurements during thermal oxidation of silicon," E. Kobeda and E. A. Irene, J. Vac. Sci. Techno. B 7(2), Mar./Apr., 1989, pp. 163–66.

In a scanning type laser reflection apparatus, either the laser beam or the surface under measurement is moved from point to point in order that the angle of reflection may be measured at each selected point. Each of the following articles discusses stress measurements performed using a scanning type laser reflection apparatus:

i) "Principles and Applications of Wafer Curvature Techniques for Stress Measurements in Thin Films," P. A. Flinn in "Thin Films: Stresses and Mechanical Properties", MRS Proceedings, vol. 130, ed. Bravman, Nix, Barnett, Smith, 1989, pp. 41–51.

ii) "In situ stress measurement of refractory metal silicides during sintering," J. T. Pan and I. Blech, J. Appl. Phys. 55(8), April 1984, pp. 2874–80.

iii) "Thermal stresses and cracking resistance of dielectric films (SiN, $Si_3N_4$, and $SiO_2$) on Si Substrates," A. K. Sinha et al., J. App. Phys. 49(4), April 1978, pp. 2423–26.

The references cited above are also illustrative of the method of stress measurement.

Because a monochromatic (i.e., one single wavelength) laser is used in either type of laser reflection stress measurement apparatuses, an apparatus in the prior art is unable to provide a reliable measurement under certain conditions. These conditions are illustrated in FIG. 1.

FIG. 1 shows a thin film t under measurement bounded by media 1 and 2 at the upper and lower surfaces of the thin film. Reflected beams a and b of incident laser beam I are shown to reflect respectively from the upper and lower interfaces (i.e. the interfaces between medium 1 and thin film t, and between medium 2 and thin film t). The reflected beams a and b will destructively interfere with each other, i.e., cancel each other, when the following conditions are satisfied: (i) the thin film's index of refraction $\mu_t$ is close to the quantity $\sqrt{\mu_1 \mu_2}$, which is the geometrical mean of media 1 and 2's individual indices of refraction ($\mu_1, \mu_2$); and, (ii) the thickness of the film is such that the two beams reflected from its two interfaces with the bounding media are out of phase by one-half wavelength. Condition (ii) is satisfied when $$d = (\lambda/n)/4 + m(\lambda/n)/2 \tag{1}$$

where $\lambda$ is the wavelength of the incident beam in air, d is the thickness of the thin film, n is the index of refraction of the thin film, and m is any integer greater than or equal to zero.

When both conditions (i) and (ii) are satisfied, the reflected beams at the interfaces destructively interfere or cancel each other resulting in either no intensity detectable or substantially diminished intensity detectable in the reflected beams.

For example, a thin film particularly difficult to measure in practice is silicon nitride, which has a refractive index of about 2, when bounded by air (refractive index of 1) and silicon (refractive index of about 4). In this example, since the index of refraction for silicon nitride is about 2, beams a and b at the respective air/silicon nitride and silicon nitride/silicon interfaces cancel each other in the manner described above, when the thickness of the thin film is one-quarter of the wavelength of the incident beam in silicon nitride, or at one-half wavelength increments thereof.

Thus, an apparatus and method capable of avoiding poor measurement of the angle of reflection due to destructive interference over a wide range of thicknesses using existing laser technology is desired.

SUMMARY OF THE INVENTION

In accordance with the present invention, an apparatus and a method for measuring the radius of curvature of a surface using two or more laser beams of various wavelengths are provided. The present invention avoids poor measurement due to destructive interference of the beams reflected at a thin film's upper and lower surfaces. The present invention is applicable to laser reflection stress measurement apparatuses of both scanning and beam-splitting types.

The present invention is better understood after considering the following detailed description in conjunction with the accompanying drawings.

BRIEF DESCRIPTION OF THE DRAWINGS

FIGS. 6A, 6B, and 6C provide disassembled views of the embodiment shown in FIG. 5.

DETAILED DESCRIPTION

The present invention is applicable to both scanning and beam-splitting types of laser reflection stress measurement apparatuses.

Figure 1:
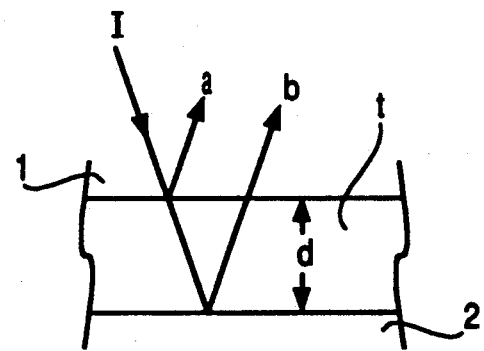
FIG. 1 shows an incident laser beam reflected at both the upper and lower surfaces of a thin film.
Figure 2:
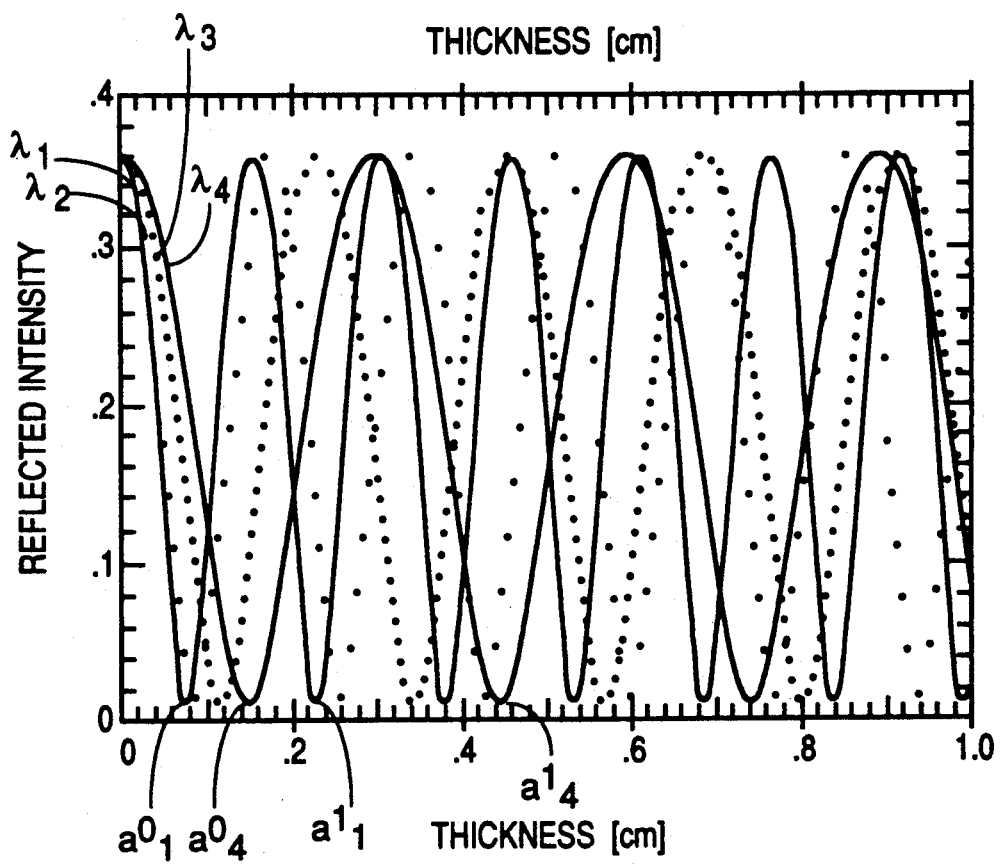
FIG. 2 shows the measured intensities of the reflected laser beams, when laser beams of wavelengths $\lambda_1$, $\lambda_2$, $\lambda_3$ and $\lambda_4$ are incident on a thin film.

According to equation (1) discussed in the "Background of the Invention" section, the thickness of the thin film at which destructive interference or cancellation occurs in the reflected beams is dependent upon both the wavelength of the incident laser beam and the refractive indices of the thin film and the bounding media. This effect is illustrated in FIG. 2. In FIG. 2, which assumes a silicon nitride index of refraction to be 2.2, the first and second minimum reflected intensities for the laser beam $\lambda_1$ (wavelength in silicon nitride=0.305 microns) are seen at film thicknesses of 0.076 microns ($a_1^0$) and 0.228 microns ($a_1^1$). Likewise, the first and second minimum intensities for the laser beam $\lambda_4$ (wavelength in silicon nitride=0.59 microns) are seen at film thicknesses 0.148 microns ($a_4^0$) and 0.443 microns ($a_4^1$). However, when minimum intensity is measured for laser beam $\lambda_1$ at a thin film thickness of 0.076 microns, the reflected intensity of laser beam $\lambda_4$ is measured to be 0.21 of the incident beam, which is sufficient intensity for the purpose of measuring the angle of reflection. Therefore, if the incident laser beam comprises more than one wavelength, the intensity of the reflected beam is likely to be adequate for the purpose of measuring the angle of reflection, unless the thickness of the thin film is a minimum intensity point for each of the component wavelengths. Minimum intensity points of different wavelengths may coincide because, as can be seen from equation (1) above, the thicknesses at which destructive interference occur are periodic. When the minimum intensity points of the different wavelengths coincide, the problem of no reflected intensity or substantially diminished reflected intensity results. However, by choosing a combination of wavelengths, sufficient intensity for measuring an angle of reflection is assured over a broad range of thicknesses.

Figure 3A:
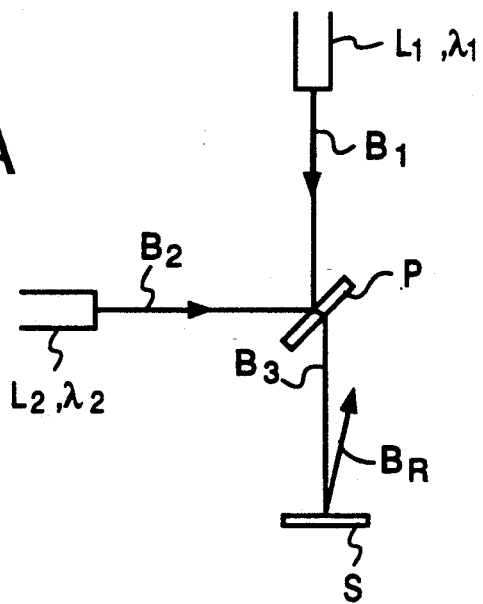
FIGS. 3a and 3b show two operation modes of a first embodiment of the present invention.
Figure 3B:
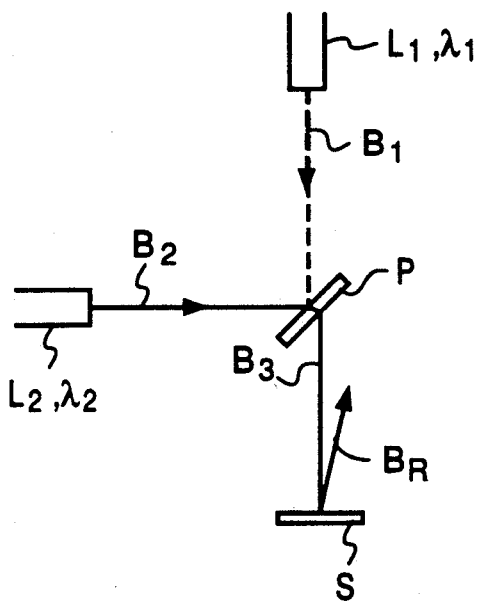

FIGS. 3a and 3b show two operation modes of a first embodiment of the present invention. A first mode of operation is shown in FIG. 3a, wherein two monochromatic lasers $L_1$ and $L_2$, having wavelengths $\lambda_1$ and $\lambda_2$ respectively, are positioned orthogonally such that their individual beams $B_1$ and $B_2$ are combined by optical element P (e.g. a beam-splitter prism) to form laser beam $B_3$, which is incident on sample S. The reflected beam $B_R$ is detected by a photodetector (not shown) to determine the angle of reflection at laser beam $B_3$'s point of incidence. If either the sample S or the apparatus (i.e. optical element P and lasers $L_1$ and $L_2$) is capable of being repositioned for measurement over multiple points on the surface of sample S, this first embodiment constitutes a scanning type laser reflection stress measurement apparatus. Alternatively, if the combined laser beam $B_3$ is split into multiple beams by a beam-splitter element P (not shown but of well known design) to be incident on multiple points on the surface of sample S, so as to allow the measurement of multiple angles of reflection at the same time, this first embodiment constitutes a beam-splitting type laser reflection stress measurement apparatus.

The use of multiple wavelengths to measure a radius of curvature is not limited to the method of having multiple laser beams impinging simultaneously on the substrate. A mechanism which allows selecting one of two or more wavelength at which acceptable reflected laser intensity is detected can also be effective.

FIG. 3b shows a second mode of operation in an embodiment of the present invention. As shown in FIG. 3b, two monochromatic lasers $L_1$ and $L_2$, having wavelengths $\lambda_1$ and $\lambda_2$ respectively, can be alternatively turned on or off. FIG. 3b shows, for the purpose of illustration only, laser beam $B_2$ of laser $L_2$ being turned on and laser beam $B_1$ of Laser $L_1$ being turned off.

Under this second mode of operation, instead of providing two laser beams simultaneously, only one laser beam is active at any time. For a given substrate, the user first tests each wavelength by measuring the reflected beam intensity of each laser and selects the wavelength showing the stronger reflected beam intensity. Measurement of the radius of curvature then proceeds with the selected laser beam.

Under the second mode of operation illustrated by FIG. 3b, an on-off switch is provided for each of lasers $L_1$ and $L_2$ to switch the lasers $L_1$ and $L_2$ on or off individually. Of course, the testing of the reflected beam intensities and the selection of which laser to use can be performed either manually or by a computer. By not requiring multiple laser beams to impinge on the substrate simultaneously, the measurement procedure is much simplified, since the accuracy of alignment required is less stringent when a beam of only one wavelength is used than when a multiple-wavelength beam is used.

Figure 4:
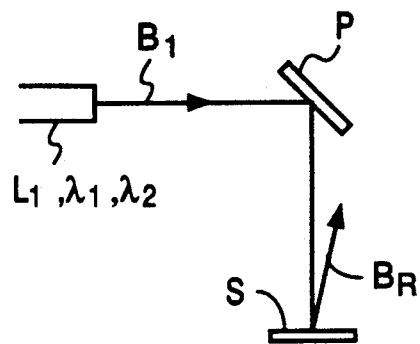
FIG. 4 shows a second embodiment of the present invention.

FIG. 4 shows a second embodiment of the present invention. As shown in FIG. 4, a laser $L_1$ is used to provide a laser beam $B_1$ having component radiations of at least wavelengths $\lambda_1$ and $\lambda_2$. In general laser $L_1$ is capable of providing a beam comprising component radiations of two or more wavelengths. An optical element P (e.g. a prism) is used to direct laser beam $B_1$ onto the surface of sample S, which reflects the incident laser beam $B_1$ as reflected beam $B_R$. Laser beam $B_R$ is detected by a photodetector (not shown) to determine the angle of reflection at laser beam $B_1$'s point of incidence. If either the sample S or the apparatus (i.e. optical element P and laser $L_1$) is capable of being repositioned for measurement over multiple points on the surface of sample S, this second embodiment constitutes a scanning type laser reflection stress measurement apparatus. Alternatively, if the combined laser beam $B_R$ is split into multiple beams by a beam-splitter element (not shown) to be incident on multiple points on the surface of sample S, so as to allow the measurement of multiple angles of reflection at the same time, this second embodiment constitutes a beam-splitting type laser reflection stress measurement apparatus. Because the laser source in this second embodiment provides a multiple wavelength beam in the first instance, the second embodiment is more suitable as a beam-splitting laser reflection stress measurement apparatus. At the time of filing this application, however, even though a gas laser source (e.g. a helium-neon laser) providing a beam of multiple wavelengths is available, a solid state laser providing such beam is not commercially available. Therefore, an embodiment such as the first embodiment is more preferable because of size and cost considerations but the invention can be implemented with any source of multiple wavelengths whether available at the time of filing this application or in the future.

The embodiment of the present invention shown in FIG. 4 can also be used in a manner similar to that illustrated by FIG. 3b in the above. Under an alternative mode of operation, the laser source $L_1$ allows the user to choose a wavelength from two or more wavelengths. The user measures the reflected beam intensity at each wavelength, and selects for the radius of curvature measurement the wavelength showing higher or highest reflected intensity. (Note that the user need only choose a wavelength above a certain minimum reflected beam intensity to obtain reliable radius of curvature measurement.) Again the testing of the reflected beam intensities and the resulting single-wavelength measurement of the radius of curvature can be performed either manually or by a computer.

Figure 5:
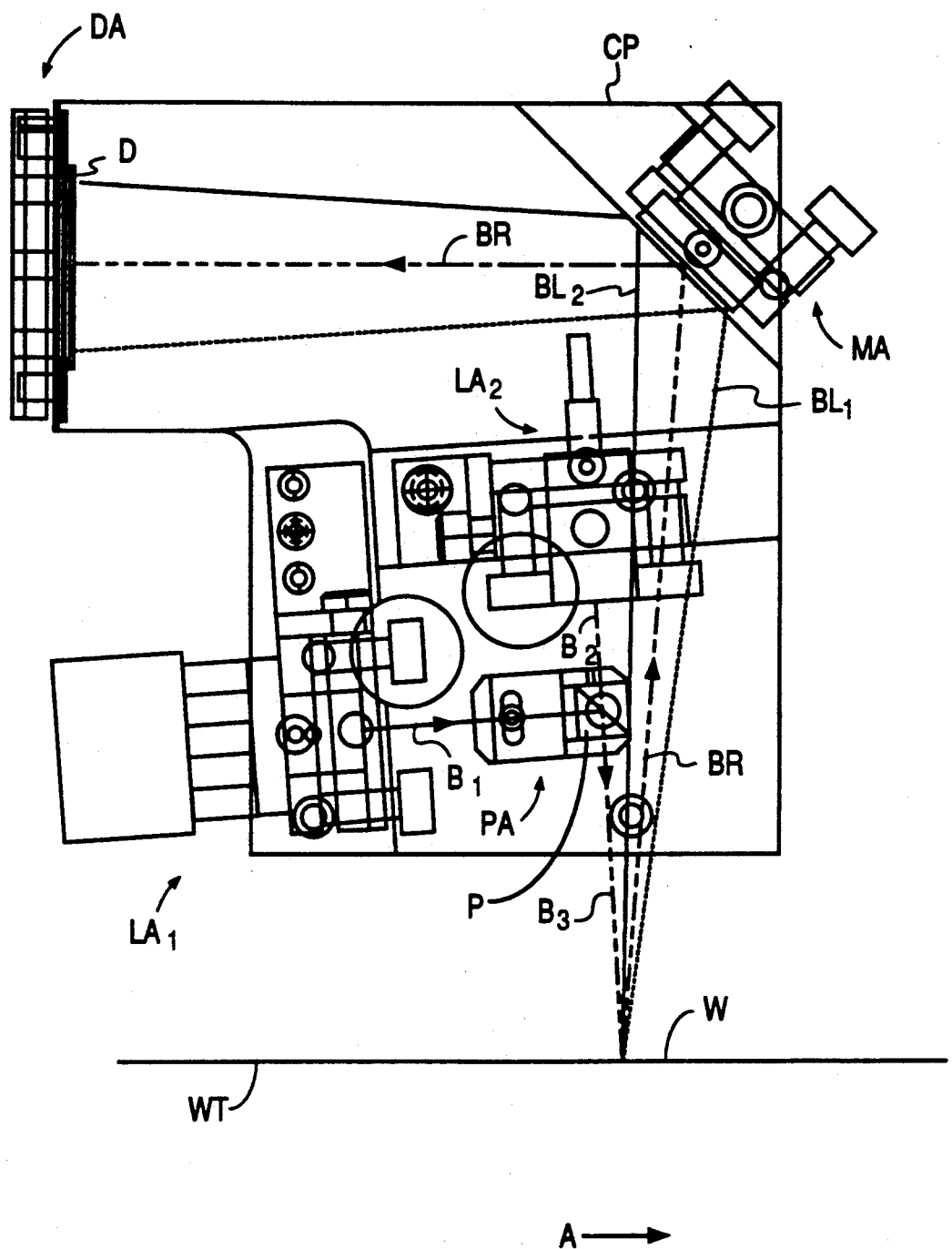
FIG. 5 shows an embodiment of the present invention in a scanning laser reflection stress measurement apparatus.

FIG. 5 shows an embodiment of the present invention in a scanning laser reflection stress measurement apparatus. As shown in FIG. 5, this embodiment comprises photodetector assembly DA, laser assemblies $LA_1$ and $LA_2$, cube beam-splitter assembly PA, and mirror assembly MA mounted on a carriage plate CP. Carriage plate CP is mounted directly above a wafer table WT, on which the sample wafer (the surface W of which is shown) is located. Carriage plate CP is movable back and forth along the direction A indicated, driven by a stepping motor (not shown) which allows the carriage plate CP to move 10 microns per step relative to the sample wafer. Inside laser assemblies $LA_1$ and $LA_2$ are, respectively, lasers $L_1$ and $L_2$ (not shown). In this embodiment, the wavelengths of the lasers are 670 nm and 750 nm. As mentioned before, depending upon the range of thicknesses of the thin film, other wavelengths may also be used. The shorter wavelength laser in this embodiment is obtainable from Power Technology Inc., Arkansas and the longer wavelength laser is obtainable from D. O. Industries, New York. A position-sensitive photodetector D, obtainable from Silicon Detector Inc., California, is contained in the photodetector assembly DA. (Other position-sensitive photodetectors may also be used as desired). In this embodiment, photodetector D provides two output voltages (positional signals) V1 and V2. The position at which a light beam is detected by photodetector D is given by the value $Va=(V2-V1)/(V2+V1)$. The correspondence between this voltage Va and actual angle of reflection is established by a calibration step when the apparatus is set up.

As shown in FIG. 5, laser beams $B_1$ and $B_2$ from lasers $L_1$ and $L_2$ respectively are combined at beam-splitting cube P, and the combined beam $B_3$ strikes the wafer surface W at the point where the angle of reflection is to be measured. The angle at which the beam $B_3$ strikes the wafer surface is designed to be as normal to the wafer surface as possible. In this embodiment, this angle is calibrated to ensure the reflected beam $B_R$ misses laser assembly $LA_1$, in order that reflected beam $B_R$ may pass by and beyond the laser assembly $LA_1$ to strike mirror $M_1$, which directs the laser beam $B_R$ at the position-sensitive photodetector D. The light rays $BL_1$ and $BL_2$ shown in FIG. 5 illustrate the positional limits between which a reflected beam can be detected by photodetector D.

Figure 6A:
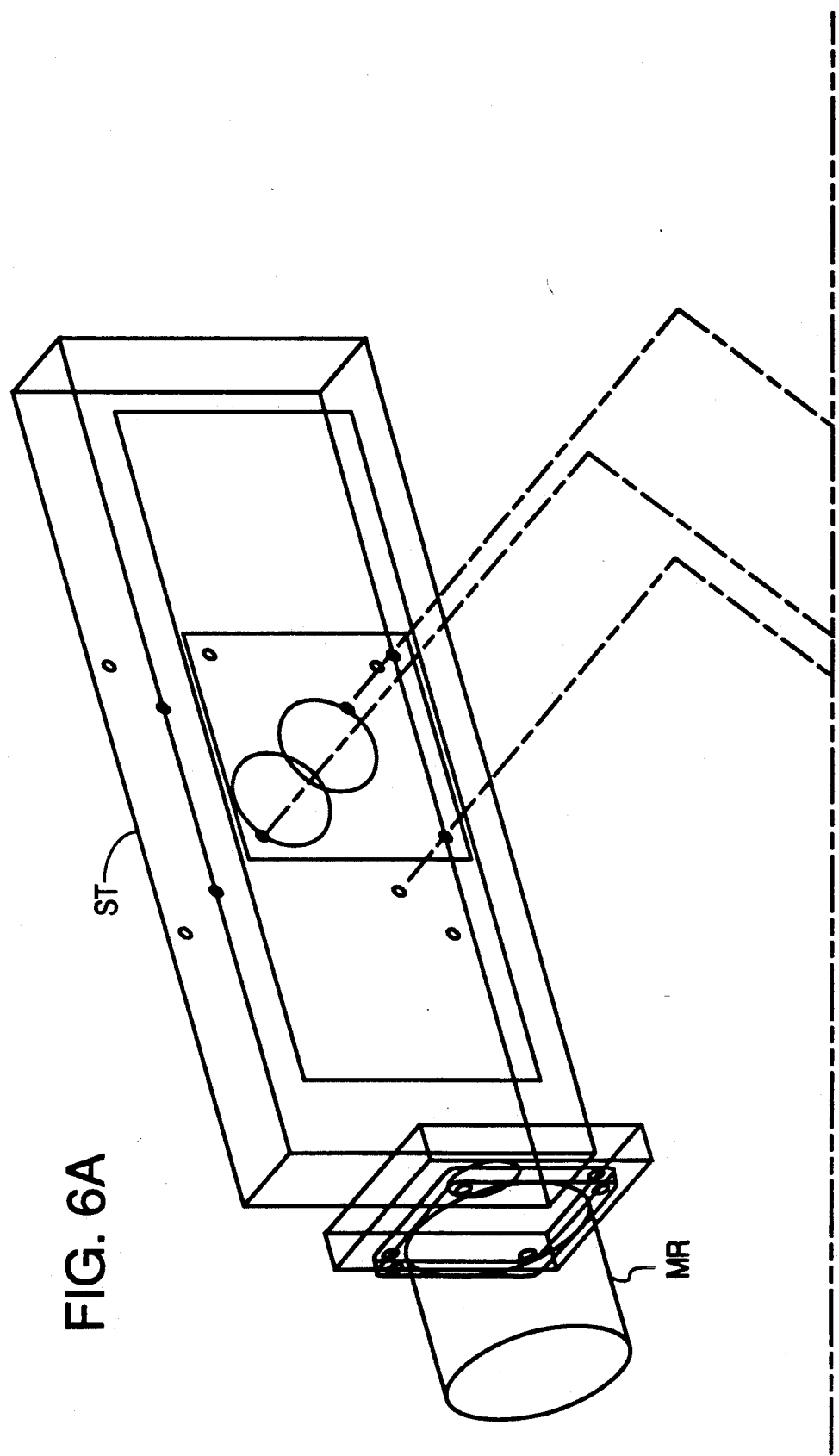
Figure 6B:
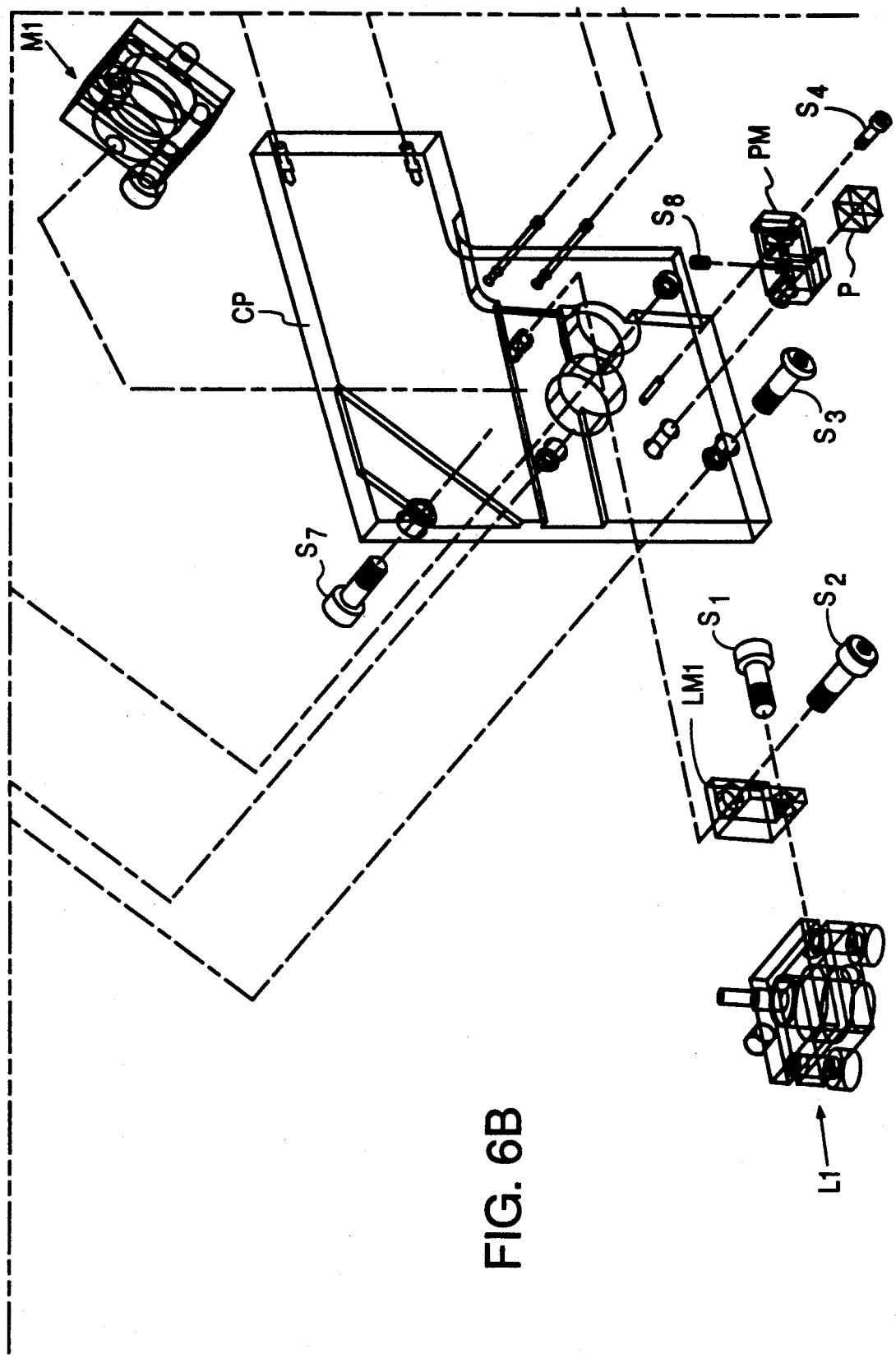

FIG. 6 shows the disassembled view of the embodiment shown in FIG. 5. As shown in FIG. 6, the lasers $L_1$ and $L_2$ are mounted respectively on laser mounts $LM_1$ and $LM_2$ by screws $S_1$ and $S_6$ to form laser assemblies $LA_1$ and $LA_2$. Laser mount $LM_1$ is attached to carriage plate CP by screw $S_2$. Laser mount $LM_2$ is attached to carriage plate CP by screw $S_5$, and the spring and retainer rings $R_1$ and $R_2$. The beam-splitter P is mounted by set screw $S_8$ on beam-splitter mount PM, which is in turn mounted on carriage plate CP by two screws (only screw $S_4$ is shown). The beam-splitter mount PM, and laser mounts $LM_1$ and $LM_2$ are positioned such that laser $L_1$'s beam, which travels downward, and laser $L_2$'s beam, which travels substantially horizontally, are combined at beam-splitter P with the combined beam emerging downward from beam-splitter P. The detector D is mounted on the detector mount DM by two screws (only screw $S_{10}$ is shown). The detector mount DM is in turn mounted as shown on carriage plate CP by screw $S_9$. Mirror assembly MA is mounted by screw $S_7$ directly above the beam-splitter P and oriented such that the reflected beam from the sample is reflected again at mirror M1 approximately 90 degrees to strike the photodetector D. Carriage plate CP is secured onto stage ST by three screws (only screw $S_3$ is shown). Stage ST is driven by a step motor MR, which provides mobility to the stage ST over the range of the scan.

Figure 7:
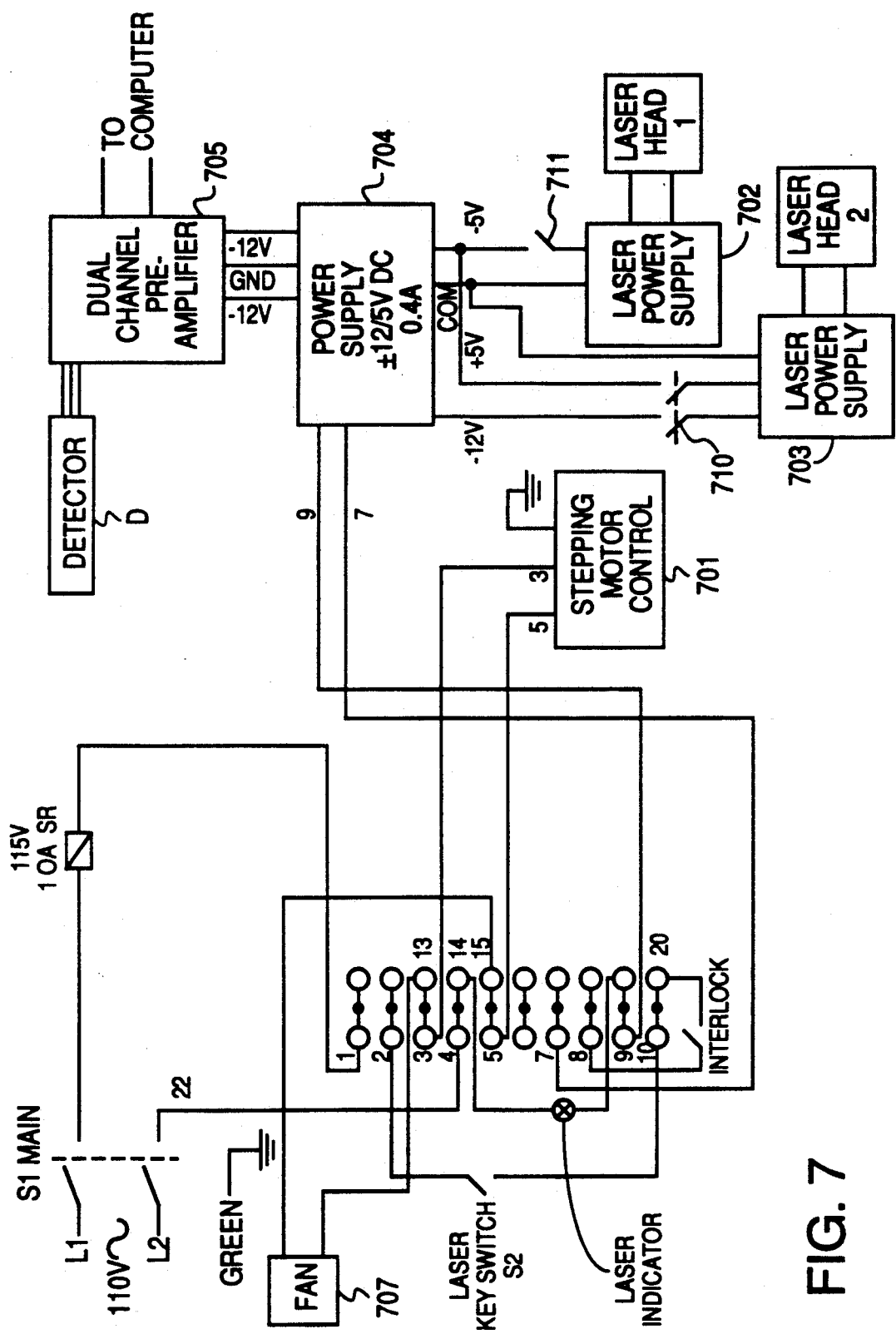
FIG. 7 shows an electrical wiring diagram for the embodiment of the present invention shown in FIG. 5.

FIG. 7 shows a electrical wiring diagram of the embodiment shown in FIG. 5. As shown in FIG. 7, external 110 V AC power is transformed by power supply module 704 into internal supply voltages +12 V, -12 V and 5 V. These supply voltages are provided to laser power supplies 702 and 703 of lasers $L_1$ and $L_2$ respectively, and to the dual channel pre-amplifier 705, which amplifies the positional signals V1 and V2 of the position-sensitive photodetector D (See description of output voltages V1 and V2 in the discussion above). The positional signals V1 and V2 are provided to an external computer (not shown) for processing. The lasers $L_1$ and $L_2$ are cooled by a fan 707, which is provided 110 V AC power. The stepping motor MR (FIG. 6) and its control 701 are also provided 110 V AC power. An interlock switch, which turns off the power supply module 704 when the housing containing the apparatus is open, is provided as a safety feature.

In FIG. 7, each laser is provided with an on-off switch. These switches are shown in FIG. 7 as switches 711 and 710 for lasers $L_1$ and $L_2$ respectively. Switches 711 and 710 allow the embodiment of FIG. 5 to operate in a manner similar to that provided above in conjunction with FIG. 3b. When switch 711 is in the "on" position, and switch 710 is in the "off" position, the user can measures the intensity of the reflected beam from laser $L_1$. Likewise, when switch 710 is in the "on" position, and switch 711 is in the "off" position, the reflected beam intensity of laser $L_2$ can be measured. Once the laser with the higher reflected beam intensity is identified, that laser is used to provide single-wavelength radius of curvature measurement.

Although two lasers are provided in each of the embodiments provided above, three or more lasers can also be provided to allow a broader range of thickness to be measured. Of course, among the factors to be considered when deciding the number of lasers to use are cost and size of apparatus.

The above detailed description is intended to illustrate the specific embodiments of the present invention and is not limiting. A skilled person in the art will be able to provide modifications and variations within the scope of the present invention, as set forth in the following claims, upon consideration of the above detailed description in conjunction with the accompanying drawings.

We claim:

1. An apparatus for measuring a local radius of curvature of a surface, comprising:
   means for providing a laser beam having a wavelength selected from a plurality of wavelengths;
   means for directing said laser beam on said surface so as to provide a reflected beam of said laser beam; and
   means for determining an angle of said reflected beam so as to provide a measurement of said local radius of curvature.

2. An apparatus as in claim 1, wherein said laser beam providing means comprises first and second lasers capable of providing, respectively, a beam of a first wavelength and a beam of a second wavelength.

3. An apparatus as in claim 1, wherein said laser beam providing means comprises a laser capable of providing a beam having a wavelength selectable from a plurality of wavelengths.

4. An apparatus as in claim 1, wherein said laser beam providing means comprising switch means for selecting one of said plurality of wavelengths.

5. An apparatus as in claim 1, wherein said surface comprises a surface whereon a film is formed.

6. A method for measuring local radius of curvature of a surface, comprising the steps of:
   directing a plurality of laser beams each having a different wavelength on said surface one laser beam at a time, so as to provide for each laser beam a reflected beam;
   selecting one of said reflected beams having intensity above a predetermined value; and
   determining an angle of said selected reflected beam so as to provide a measurement of said local radius of curvature.

7. A method as in claim 6, wherein said selection step further comprises the step of enabling the selected laser beam and disabling all laser beams not selected using switch means.

8. A method as in claim 6, wherein said surface comprises a surface whereon a film is formed.

9. Method of measuring the radius of curvature of partially reflective films of the type that can create destructive interference at least at one wavelength, comprising:
   providing a plurality of laser beams having different wavelengths,
   selecting one of said wavelengths of said laser beams to impinge upon and provide a reflected return signal from a plurality of locations on the surface of a reflective film whose curvature is to be measured without destructive interference, and
   determining an angle of reflection for said selected reflected beam from said locations so as to provide a measurement of the radius of curvature of said surface.

10. The method of claim 9 wherein said selecting step is carried out by switching among said plurality of beams to determine an appropriate measurement wavelength.

* * * * *

UNITED STATES PATENT AND TRADEMARK OFFICE
CERTIFICATE OF CORRECTION

PATENT NO. : 5,248,889
DATED : September 28, 1993
INVENTOR(S) : Ilan A. Blech and Dov E. Hirsch It is certified that error appears in the above-identified patent and that said Letters Patent is hereby corrected as shown below:

Column 3, line 52, delete "a40" and insert --$a_4°$--.

Signed and Sealed this

Seventeenth Day of May, 1994

Attest:

BRUCE LEHMAN

Attesting Officer     Commissioner of Patents and Trademarks